United States Patent
Park et al.

(10) Patent No.: US 9,672,648 B2
(45) Date of Patent: Jun. 6, 2017

(54) AUGMENTED REALITY AIDED NAVIGATION

(71) Applicant: VMware,Inc., Palo Alto, CA (US)

(72) Inventors: Sung Park, Palo Alto, CA (US); Gabriel Tarasuk-Levin, Sunnyvale, CA (US); Min Cai, Sunnyvale, CA (US); Uma Chingunde, San Francisco, CA (US); Anupama Chandwani, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 321 days.

(21) Appl. No.: 14/057,834

(22) Filed: Oct. 18, 2013

(65) Prior Publication Data

US 2015/0109334 A1    Apr. 23, 2015

(51) Int. Cl.
*G09G 5/00* (2006.01)
*G06T 11/60* (2006.01)
*G06F 3/048* (2013.01)

(52) U.S. Cl.
CPC ............ *G06T 11/60* (2013.01); *G06F 3/048* (2013.01)

(58) Field of Classification Search
None
See application file for complete search history.

(56) References Cited

U.S. PATENT DOCUMENTS

| | | |
|---|---|---|
| 2011/0185063 A1 | 7/2011 | Head et al. |
| 2012/0016578 A1* | 1/2012 | Coppens ............... G01C 21/32 701/433 |
| 2012/0059720 A1* | 3/2012 | Musabji ............ G01C 21/3638 705/14.58 |
| 2012/0215912 A1 | 8/2012 | Houlihan et al. |
| 2012/0226804 A1 | 9/2012 | Raja et al. |
| 2012/0249588 A1* | 10/2012 | Tison .................... G06F 1/1696 345/633 |
| 2013/0026220 A1* | 1/2013 | Whelihan ............ G06Q 10/087 235/375 |
| 2013/0106906 A1 | 5/2013 | Roche et al. |
| 2013/0211718 A1* | 8/2013 | Yoo ...................... G01C 21/206 701/500 |
| 2014/0028708 A1 | 1/2014 | Deluca et al. |
| 2014/0055488 A1* | 2/2014 | Masters ................. G06F 3/147 345/633 |
| 2014/0214601 A1 | 7/2014 | Argue et al. |
| 2014/0344806 A1 | 11/2014 | Suresh et al. |
| 2015/0043378 A1 | 2/2015 | Bardgett et al. |
| 2015/0089497 A1 | 3/2015 | Borzycki et al. |

* cited by examiner

Primary Examiner — Ryan R Yang

(57) ABSTRACT

In a computer-implemented method for augmented reality aided navigation to at least one physical device indicia corresponding to the at least one physical device supporting virtualization infrastructure is observed. Based on the observed indicia, navigational cues correlating to a location of the at least one physical device is generated. Navigational cues are displayed such that augmented reality aided navigation is provided to the at least one physical device.

14 Claims, 14 Drawing Sheets

AUGMENTED REALITY AIDED NAVIGATION

CROSS-REFERENCE TO RELATED APPLICATIONS

This application is related to co-pending U.S. patent application Ser. No. 14/057,889, filed on Oct. 18, 2013, entitled "AUGMENTING A PHYSICAL DEVICE WITH VIRTUAL INFORMATION," by Park et al., and assigned to the assignee of the present application.

BACKGROUND

A datacenter includes a large number of devices that support various large scale computing systems. When a device is in need of physical service and/or troubleshooting, the device is required to be located within the datacenter such that a technician is able to service the device at the location of the device. Typically, the technician is provided a unique identification of the device, such as an IP address. The unique identification does not facilitate in physically locating the device out of thousands of other devices in the datacenter.

Moreover, when a device is located in a datacenter, it is difficult to determine what information, such as virtual information, correlates to the underlying device. Accordingly, accessibility of vital maintenance information is difficult, which may result in potential mishaps and errors in the service of the device.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
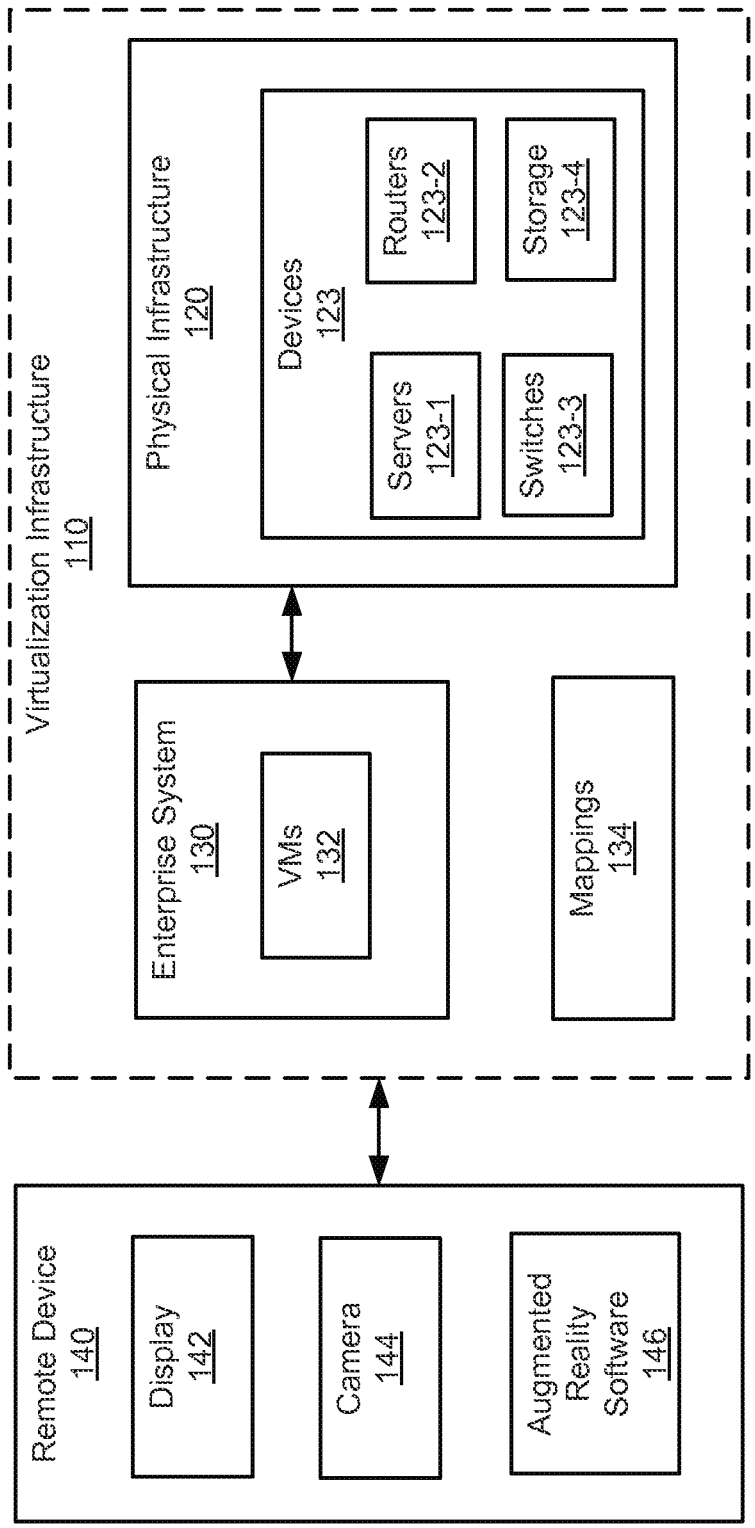
FIG. 1 is a block diagram that illustrates an embodiment of a virtualization infrastructure.

FIG. 1 depicts a block diagram that illustrates virtualization infrastructure 110, according to various embodiments. Virtualization infrastructure 110 includes physical infrastructure 120 and enterprise system 130.

In general, enterprise system 130 is a corporate system or network that includes a combination of computer hardware and software. The corporation or enterprise utilizes the combination of hardware and software to organize and run its operations. For example, an enterprise system may provide various computing resource for various needs such as, but not limited to information technology (IT), security, email, etc.

In various embodiments, enterprise system 130 includes a plurality of devices. The devices are any number of physical and/or virtual machines (e.g., virtual machines 132). For example, in one embodiment, enterprise system 130 is a corporate computing environment that includes tens of thousands of physical and/or virtual machines. It is understood that a virtual machine is implemented on physical infrastructure 120 that includes one or some combination of physical computing machines.

The physical and/or virtual machines include a variety of applications (e.g., operating system, word processing, etc.). The physical and/or virtual machines may have the same installed applications or may have different installed applications or software. The installed software may be one or more software applications from one or more vendors.

The virtual machines may include a guest operating system. Moreover, virtual machines 132 may be logically grouped. That is, a subset of virtual machines may be grouped together in a container (e.g., VMware vApp™). For example, three different virtual machines may be implemented for a particular workload. As such, the three different virtual machines are logically grouped together to facilitate in implementing the workload. The virtual machines in the logical group may execute instructions alone and/or in combination (e.g., distributed) with one another. Also, the container of virtual machines and/or individual virtual machines may be controlled by a virtual management system. Virtualization infrastructure 110 may also include a plurality of virtual datacenters. In general, a virtual datacenter is an abstract pool of resources (e.g., memory, CPU, storage). It is understood that a virtual data center is implemented on one or some combination of physical machines (e.g., servers 123-1).

Enterprise system 130 may be located in an Internet connected datacenter or a private cloud computing center coupled with one or more public and/or private networks. Enterprise system 130, in one embodiment, typically couples with a virtual or physical entity in a computing environment through a network connection which may be a public network connection, private network connection, or some combination thereof. For example, a user may couple via an Internet connection with enterprise system 130 by accessing a web page or application presented by enterprise system 130 at a virtual or physical entity.

Physical infrastructure 120 includes various devices 123 that are the underlying physical computing hardware that supports virtualization infrastructure 110. Such devices can be servers 123-1, routers 123-2, network switches 123-3, storage 123-4, etc. It should be appreciated that physical infrastructure 120 includes any number of various devices that may also include, storage arrays, CPUs, memory, cables, etc.

In various embodiments, servers 123-1, as described herein, may be hosts for various virtual machines (e.g., virtual machines 132). Further description of a host machine is described below with respect to FIG. 10. It should be appreciated that resources (e.g., CPUs, memory, storage, etc.) of a host system, that are allocated for use by the virtual machines, may also be considered underlying physical computing hardware that supports virtualization infrastructure 110.

Remote device 140 includes display 142 and camera 144. For example, remote device 140 is a hand-held mobile device that is able to capture an image, by camera 144, and display the image on display 142. Remote device 140 can be, but is not limited to, a smart phone, computer tablet, camera glasses, personal digital assistant (PDA), etc.

Remote device 140 is able to access various resources and functionality of virtualization infrastructure 110. For example, remote device 140 is able access virtual infrastructure 110 to facilitate in providing augmented reality associated with physical infrastructure 120. For example, the augmented reality provides at least navigation to a location of a device(s) in physical infrastructure and/or displaying virtual information associated with device(s), which will be described in further detail below.

In one embodiment, remote device 140 includes software that accesses virtual infrastructure 110 and enables remote device to facilitate in augmented reality. For example, the augmented reality enables an administrator to efficiently access virtual information that correlates with the underlying physical infrastructure.

Figure 2A:
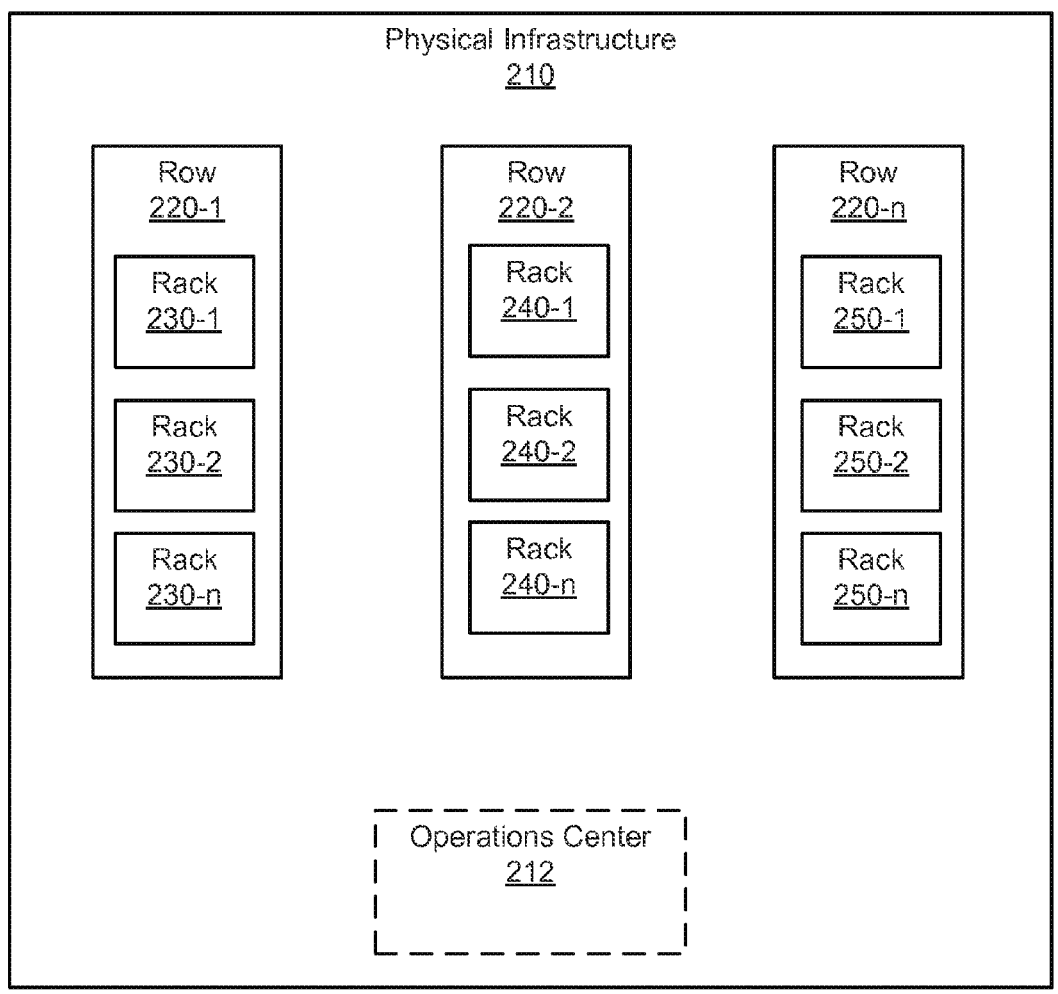
FIG. 2A depicts a block diagram of a top view of a physical infrastructure, according to various embodiments.

FIG. 2A depicts a block diagram of a top down view of an embodiment of physical infrastructure 210. Physical infrastructure 210, in one embodiment, is a large building that includes multiple rows of devices. In particular, the devices are disposed on multiple racks within each row.

For example, physical infrastructure 210 includes row 220-1, row 220-2, and row 220-n. Although three rows are depicted, physical infrastructure 210 can include any number of rows of devices.

Each row may include numerous racks. For example, row 220-1 includes racks 230-1, 230-2 and 230-n, row 220-2 includes racks 240-1, 240-2 and 240-n, and row 220-n includes racks 250-1, 250-2 and 250-n.

The racks include various computing hardware (e.g., devices 123) that supports virtual infrastructure 110.

In various embodiments, physical infrastructure 210 is a datacenter. In general, a datacenter is a facility that houses large scale computer systems and associated components. Physical infrastructure 210 may also be, but is not limited to, a server farm which includes numerous servers (e.g., thousands) and associated devices.

Figure 2B:
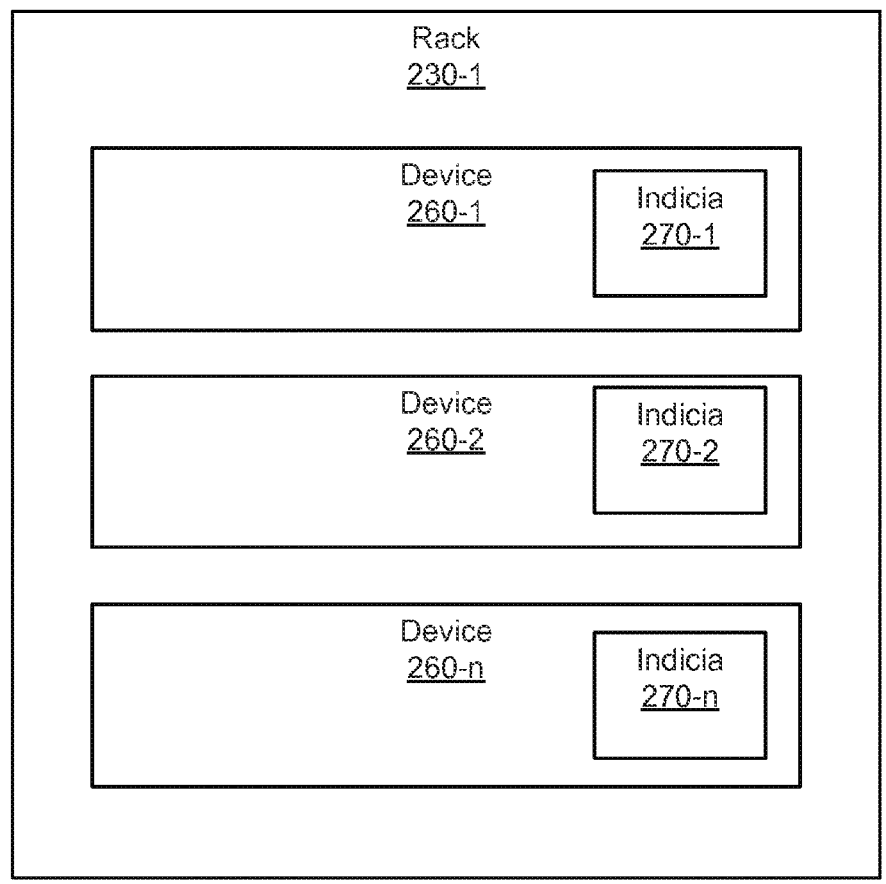
FIG. 2B depicts a block diagram of a frontal view of a rack, according to various embodiments.

FIG. 2B depicts a block diagram of rack 230-1. It should be appreciated that rack 230-1 may represent any rack disposed in physical infrastructure 210. Rack 230-1 includes devices 260-1, 260-2 and 260-n (e.g., any one of devices 123). Although three devices are depicted, it should be appreciated that rack 230-1 can include any number of devices that are able to be housed in rack 230-1.

In various embodiments, each device includes indicia that are utilized for augmented reality. For example, device 260-1 includes indicia 270-1, rack 260-2 includes indicia 270-2, and rack 260-n includes indicia 270-n.

As described in further detail below, the term indicia, as used herein, describes one or more identifiable features corresponding to a device, structure, etc. Moreover, the term indicia, as used herein, does not necessarily describe more than one indicium. However, in some embodiments, indicia may describe more than one indicium.

In various embodiments, indicia can be located at various locations such as, but not limited to, hallways, walls, racks, rows, devices, etc.

Referring again to FIG. 2A, physical infrastructure 210, in one embodiment, includes operations center 212 (e.g., network operations center (NOC)). Operations center 212 may be located locally at or near physical infrastructure 210 or may be located remotely from physical infrastructure 210.

Operations center 212 is a control center that is utilized by administrators of the virtualization infrastructure 110 and/or physical infrastructure 210 to monitor, manage and/or control physical infrastructure 210. For example, an IT administrator utilizes various software applications (e.g., VMware™ vCenter Operations Manager™ (vCOPS), vCloud Director™ (VCD), vCloud Automation Center™ (vCAC)) to monitor the operation and/or health of the various devices in physical infrastructure 210. Such management software allows, for example, the management of multiple ESX servers and virtual machines from different ESX servers through a single console application. If problems associated with devices arise, the IT administrator may access the devices from the operations center to attempt to fix the devices.

However, in some instances, the IT administrator or the like has to physically locate the problem device and physically manipulate the device in order to correct the issues/problems with the device.

Figure 3A:
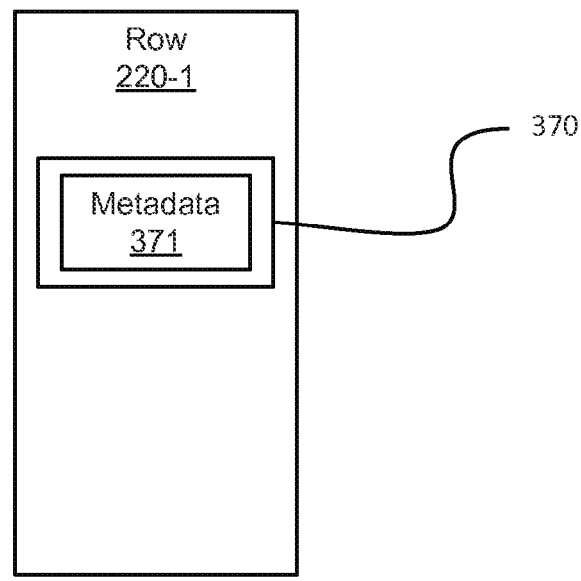
FIG. 3A depicts a block diagram of a side view of a row of racks, according to various embodiments.

FIG. 3A depicts a block diagram of a side view of row 220-1. Row 220-1 includes indicia 370. It is noted that indicia 370 attached to row 220-1, as depicted, may represent any indicia described herein.

Indicia 370 is utilized to facilitate in providing augmented reality. For example, indicia 370 is an image target that is able to be viewed by camera 144 of remote device 140 and identified via software 146.

In various embodiments, indicia 370 is any 2-D or 3-D object that is able to be viewed (e.g., observed, captured, etc.) by camera 144 and identified via augmented reality software 146. In one embodiment, indicia 370 is a frame marker (e.g., Qualcomm Frame Marker™ (QFM)).

As will be described in further detail below, indicia can be any unique and identifiable physical feature. For example, indicia may be the physical features of a rack. As such, when the rack is captured by camera 144 the rack is then identified by augmented reality software 146.

In one embodiment, indicia is any identifiable feature of a device. For example, a hardware device such as a network switch has various ports. Any physical feature of the housing/ports/slots of the hardware device may be visually identifiable and subsequently used for augmented reality of the hardware device. Additionally, indicia may be any combination of a physical feature, 2D object, and 3D object.

Augmented reality software 146 (e.g., Vuforia™ SDK) is utilized to identify indicia 370 that is captured by camera 144. In one embodiment, software 146 uses computer vision technology to recognize and track planar images (e.g., image targets, physical features) and/or 3D objects in real-time. This image registration capability enables positioning and orienting virtual objects, such as 3D models and other media, in relation to real world images that are viewed through the camera of a mobile device.

The position and orientation of the image is tracked in real-time so that the viewer's perspective on the virtual object corresponds with their perspective on the image target, so that it appears that the virtual object is a part of the real world scene.

More specifically, software 146 provides the ability to translate from camera-visible objects (e.g., indicia) to 3-D space coordinates. In one embodiment, this allows leverage of Open Graphics Library (OpenGL) to render objects in locations relative to the detected camera-visible objects. For example, given a visible indicia, software 146 computes the 3-D points making up the plane holding the object in camera space. Accordingly, models in OpenGL for Embedded Systems (OpenGL ES) are rendered relative to the visually detected planes visible object. Additionally, any metadata that is embedded in the visible object is able to be detected and utilized.

In one embodiment, indicia 370 includes metadata 371. Metadata 371 may be any information that is associated with the indicia and/or devices associated with the indicia. Metadata 371 may be visually represented by any means that is compatible to being captured by camera 144 and identified by software 146. For example, metadata 371 may be represented by unique markings (e.g., colors, markings, patterns, etc.) that are disposed, for example, on the perimeter of indicia 370.

Metadata 371 may include, but is not limited to, indicia identification, indicia location (e.g., coordinates, relative position with respect to other indicia, devices, etc.), device location (e.g., coordinates, relative position with respect to other indicia, devices, etc.), any related information associated with devices (e.g., device ID, manufacturer, model, CPU cores, maintenance schedule, etc.) and the like.

In various embodiments, various information (e.g., metadata 371) is associated or mapped with corresponding indicia which is then stored in mappings 134. For example, indicia 370 is attached to a side wall of row 220-1. Accordingly, a mapping is generated which indicates that indicia 370 located on a side wall of row 220-1. Moreover, the mapping may also correlate indicia 370 with any rack and/or devices in the racks associated with row 220-1. In another example, a mapping is created between an indicia ID and the associated hardware's unique ID such as, Network Interface Card (NIC) address or Internet Protocol (IP) address.

Figure 3B:
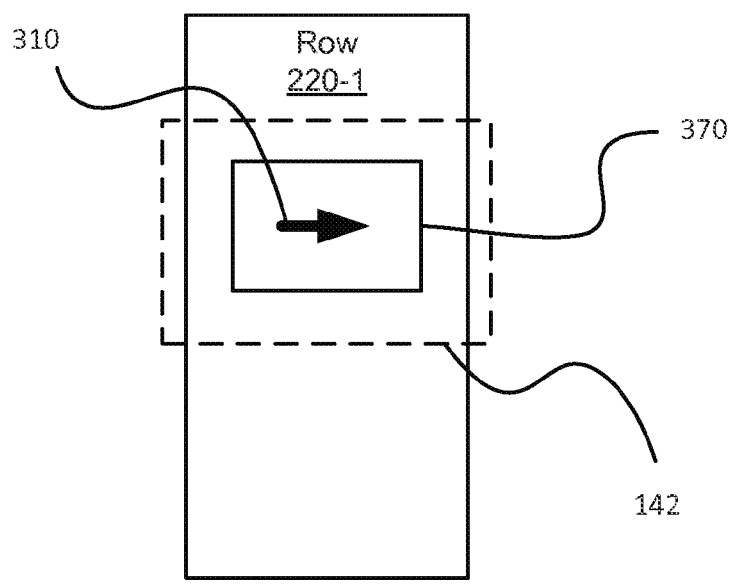
FIG. 3B depicts a block diagram of a side view of a row of racks, according to various embodiments.

It should be appreciated that various means may be utilized to facilitate in determining the location of a user and/or observed indicia, such as, but not limited to, global positioning system (GPS), WiFi, etc. For example, a user observing a particular indicia (having a known location) may be used to deduce the location of the user FIG. 3B depicts a block diagram of an embodiment of augmented reality aided navigation of devices within physical infrastructure 120.

For example, an IT administrator, while in operations center 212, identifies that various virtual machines are performing poorly. The poor performing virtual machines are determined to be hosted on a particular server. As a result, the server needs to be physically located such that the IT administrator may perform physical maintenance and/or troubleshooting.

However, the particular server may be difficult to locate because the IT administrator is only provided the IP address of the server. Additionally, the rows and racks are not intuitively identified and labeled for easy navigation. Moreover, the server may be one of thousands of hardware devices located in various rooms of physical infrastructure 210 which makes the server difficult to locate. Accordingly, augmented reality aided navigation is provided to locate physical hardware within physical infrastructure 210.

More specifically, the IT administrator seeks to physically locate the server within a datacenter such that the IT administrator can perform maintenance and/or troubleshooting to the server. Accordingly, various indicia located within physical infrastructure 120 are observed and identified via remote device 140 and navigation cues are displayed based on the observation/identification of the indicia.

In various embodiments, indicia may be integral with surrounding structures. For example, the indicia is embedded in the floors, walls, ceiling of the building that houses physical infrastructure 120.

For instance, the IT administrator is looking for a server that is located on rack 250-1 of row 220-n. The IT administrator approaches row 220-1 and observes indicia 370 via camera 144. Software 146 identifies indicia 370 and determines that indicia 370 is located on a side wall of row 220-1 via mappings 134. Moreover, it is determined that the server that is being sought is to the right of row 220-1. Accordingly, navigational cue 310 (e.g., arrow pointing to the right) is displayed on display 142 to provide navigation assistance to the location of the server. In one embodiment, navigational cue 310 is overlayed on indicia 370.

In the alternative, if it was determined that a location of a device is to the left of row 220-1 then a navigational cue (e.g., arrow pointing to the left) would be displayed to provide navigational assistance to the location of the device.

As the IT administrator continues to follow navigational cues based on observing various indicia, the IT administrator will eventually be guided to the actual location of the desired server.

It should be appreciated that navigational cues can be any visual cue that facilitates in navigation to the location of devices in physical infrastructure 120. For example, navigation cues can be but are not limited to, directions, instructions, maps, photos, etc.

Figure 3C:
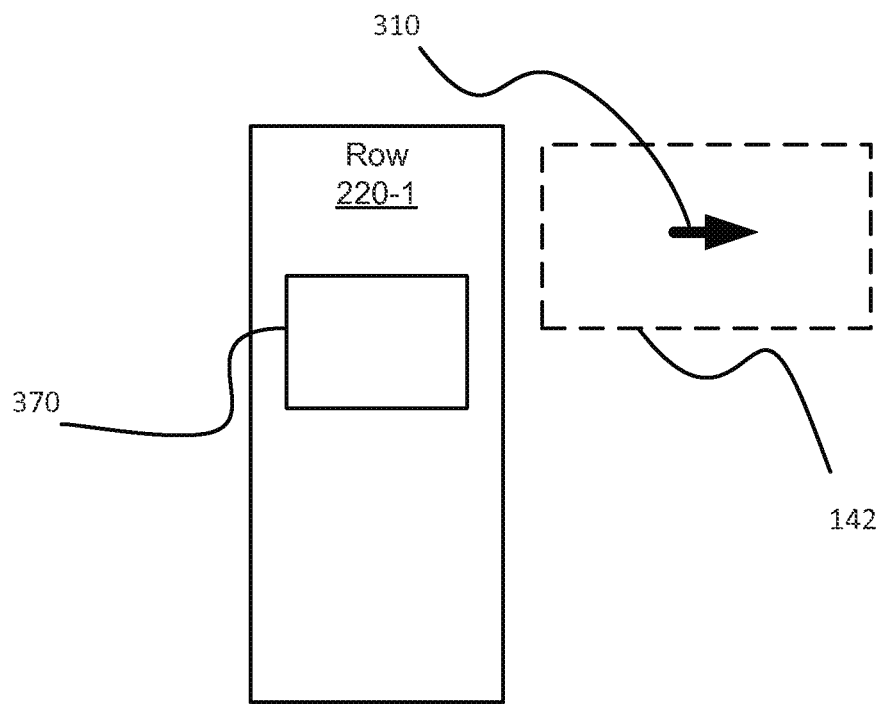
FIG. 3C depicts a block diagram of a side view of a row of racks, according to various embodiments.

FIG. 3C depicts a block diagram of an embodiment of augmented reality aided navigation of devices within physical infrastructure 120. In one embodiment, navigational cue 310 is displayed on a display offset from indicia 370. For example, remote device 140 is camera glasses (e.g., Google Glass™). Accordingly, camera 144 observes indicia 370 and navigational cue 310 is displayed on display 142, as described above.

Figure 4A:
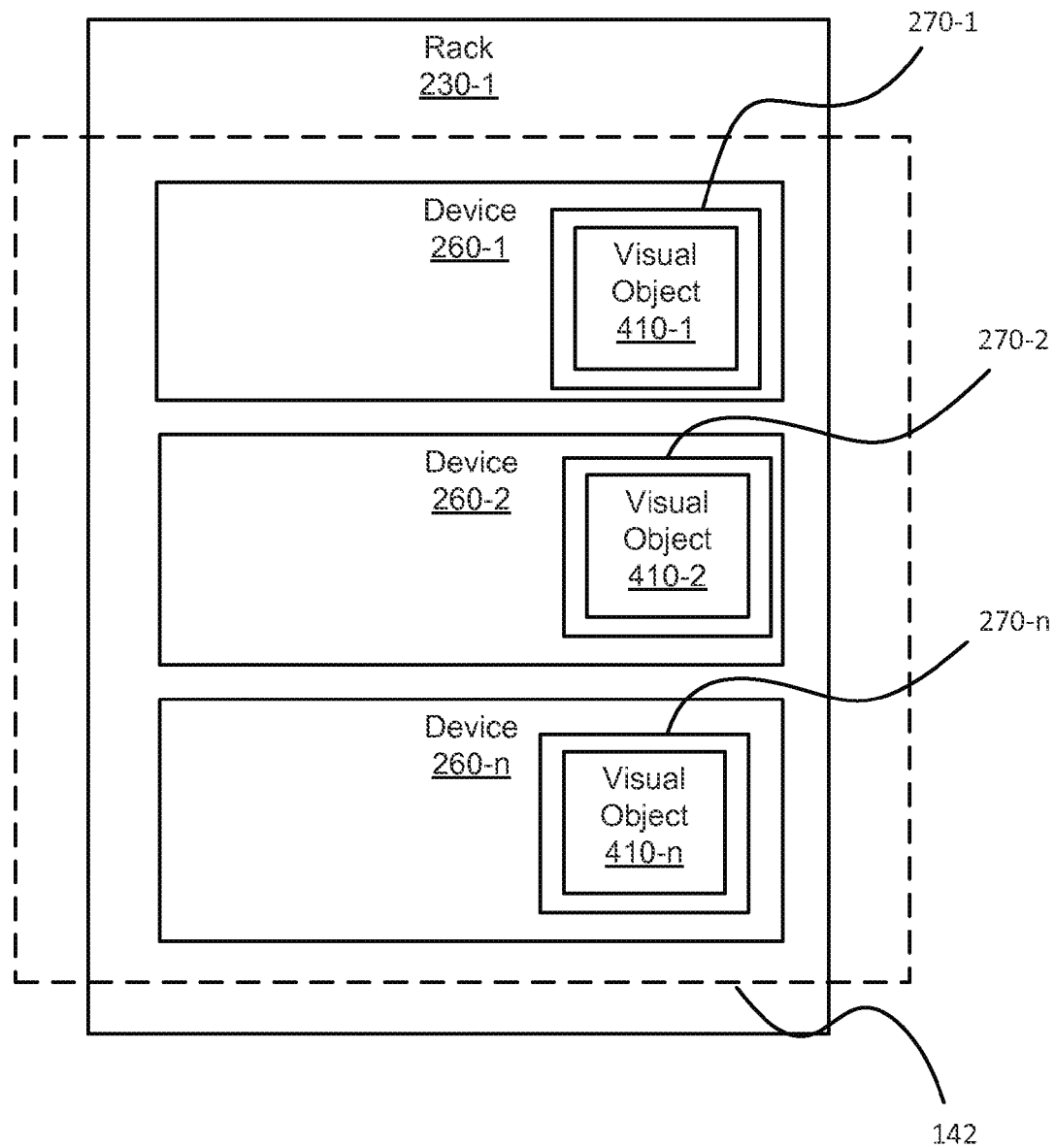
FIG. 4A depicts a block diagram of a frontal view of a rack, according to various embodiments.

FIG. 4A depicts a block diagram of an embodiment of augmented reality associated with devices in a physical infrastructure. For example, camera 144 observes one or more of indicia 270-1, 270-2, and 270-n attached to devices 260-1, 260-2 and 260-n, respectively. Accordingly, visual objects 410-1, 410-2, and 410-n are overlayed on display 142 to provide augmented reality pertaining to the devices.

In one embodiment, a visual object is a positive indication that the device has been properly located. For example, an IT administrator is seeking to locate device 260-1 which is a server that needs to be physically located to undergo maintenance. Indicia 270-1 is observed and identified by remote device 140. Additionally, mappings 134 indicate that indicia 270-1 is attached to device 260-1 which results in a confirmation that device 260-1 is located. Accordingly, visual object 410-1 is overlayed on indicia 270-1 such that augmented reality is provided to the user confirming that device 260-1 is located. Visual object 410-1 could be any visual object (e.g., green light, text, etc.) that portrays a positive confirmation that device 260-1 is located.

In another embodiment, the visual object is an indication that the observed device is not the sought after device. For example, an IT administrator is seeking to locate device 260-1 which is a server that needs to be physically located to undergo maintenance. Indicia 270-2 and 270-n are observed and identified by remote device 140. Additionally, mappings 134 indicate that that indicia 270-2 and 270-n are attached to devices 260-2 and 260-n, respectively, neither of which are the sought after device. Accordingly, visual objects 410-2 and 410-n are overlayed on indicia 270-2 and 270-n, respectively, such that augmented reality is provided to the user confirming that the observed devices are not the sought after device.

A visual object, in one embodiment, is virtual information associated with the underlying physical hardware. For example, visual object 410-1 may include a list of virtual machines hosted by device 260-1.

Visual objects may be any visual information (e.g., virtual information, navigational cues, device information, user interface, etc.) that facilitate in management of virtualization infrastructure 110.

Figure 4B:
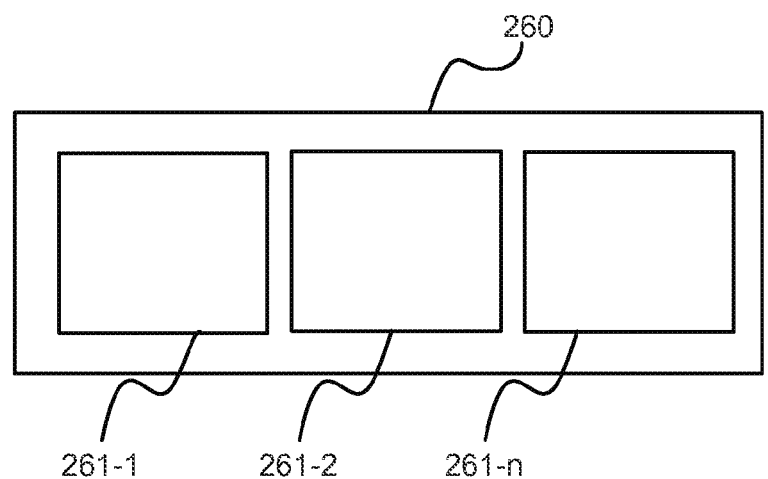
FIG. 4B depicts a block diagram of a device, according to various embodiments.

FIG. 4B depicts an embodiment of a block diagram of a device 260 that includes features 261-1, 261-2, and 261-n. For example, device 160 is a network switch and the features are ports for physically and electronically coupling with cables. Physical features 261-1, 261-2, and 261-n can be any number of visually identifiable features such as, slots, buttons, switches, ports, etc. In one embodiment, device 260 includes indicia that is, for example, a frame marker.

Figure 4C:
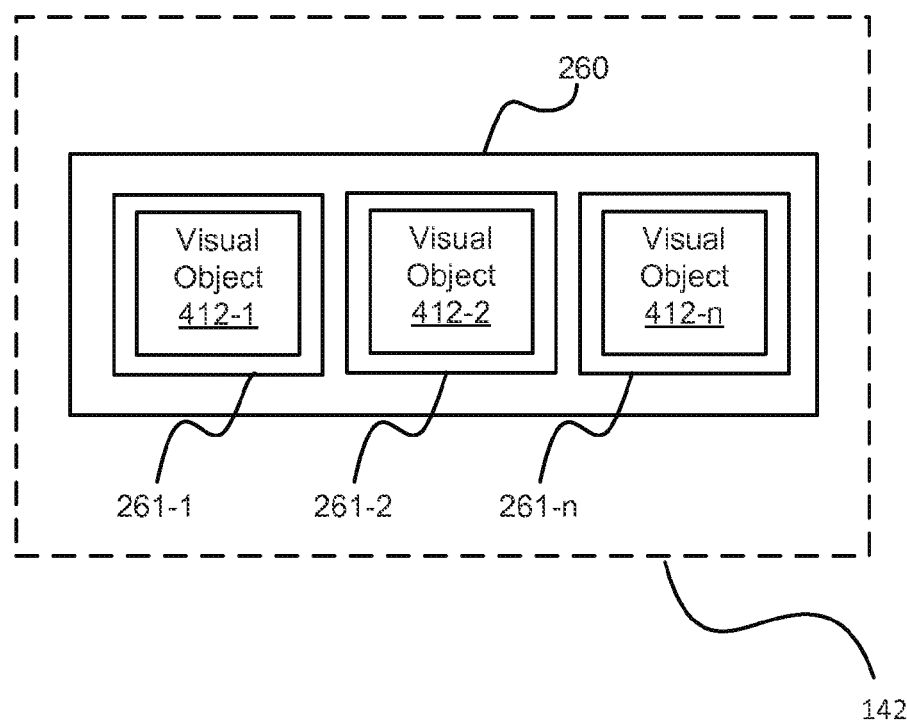
FIG. 4C depicts a block diagram of a device, according to various embodiments.

FIG. 4C depicts a block diagram of an embodiment of augmented reality associated with a device in a physical infrastructure. For example, camera 144 captures device 260 and any one of features 261-1, 261-2, and 261-n. The device and features are identified and one or more of visual object 412-1 is displayed in relation to feature 261-1, visual object 412-2 is displayed (e.g., overlayed) in relation to feature 261-2, and visual object 412-n is displayed in relation to feature 261-n. In one embodiment, a frame marker attached to device 260 is identified and the visual objects are overlayed to their respective features.

Visual objects 412-1, 412-2 and 412-n can be any information associated with respective features 261-1, 261-2, and 261-n. For example, visual objects 412-1, 412-2 and 412-n can be, but are not limited to, port identification, slot identification, associated cable, alerts associated with the features, etc.

In one embodiment, a cable is seated within a feature (e.g., a port). Augmented reality is provided by overlaying an associated visual object that identifies the other device where the cable is terminated.

Figure 4D:
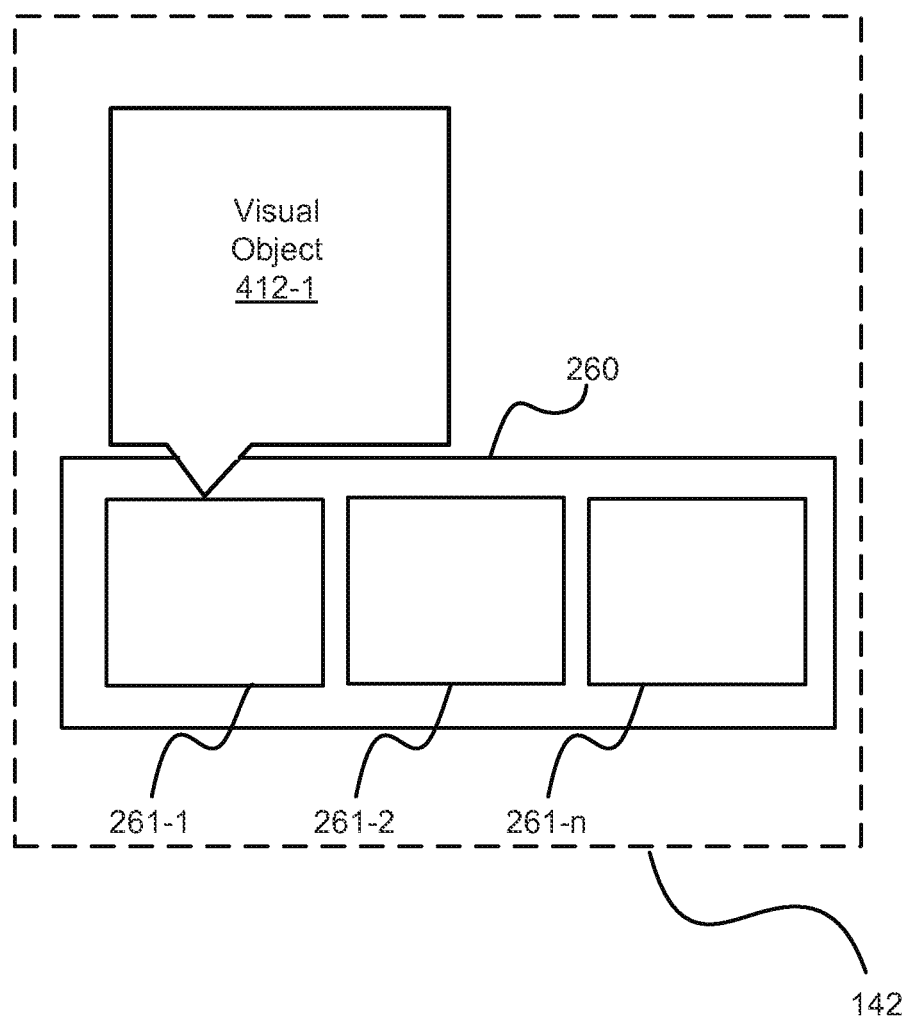
FIG. 4D depicts a block diagram of a device, according to various embodiments.

FIG. 4D depicts a block diagram of an embodiment of augmented reality associated with a device in a physical infrastructure. FIG. 4D is similar to FIG. 4C, as described above. However, visual object 412-1 associated with feature 261-1 is displayed in proximity to feature 261-1. For example, visual object 412-1 is a user interface that allows a user to control/manage device 260 and/or feature 261-1 (e.g., a port). In one embodiment, the user interface has similar features and functionality as the user interface depicted in FIG. 5 and described herein.

Figure 5:
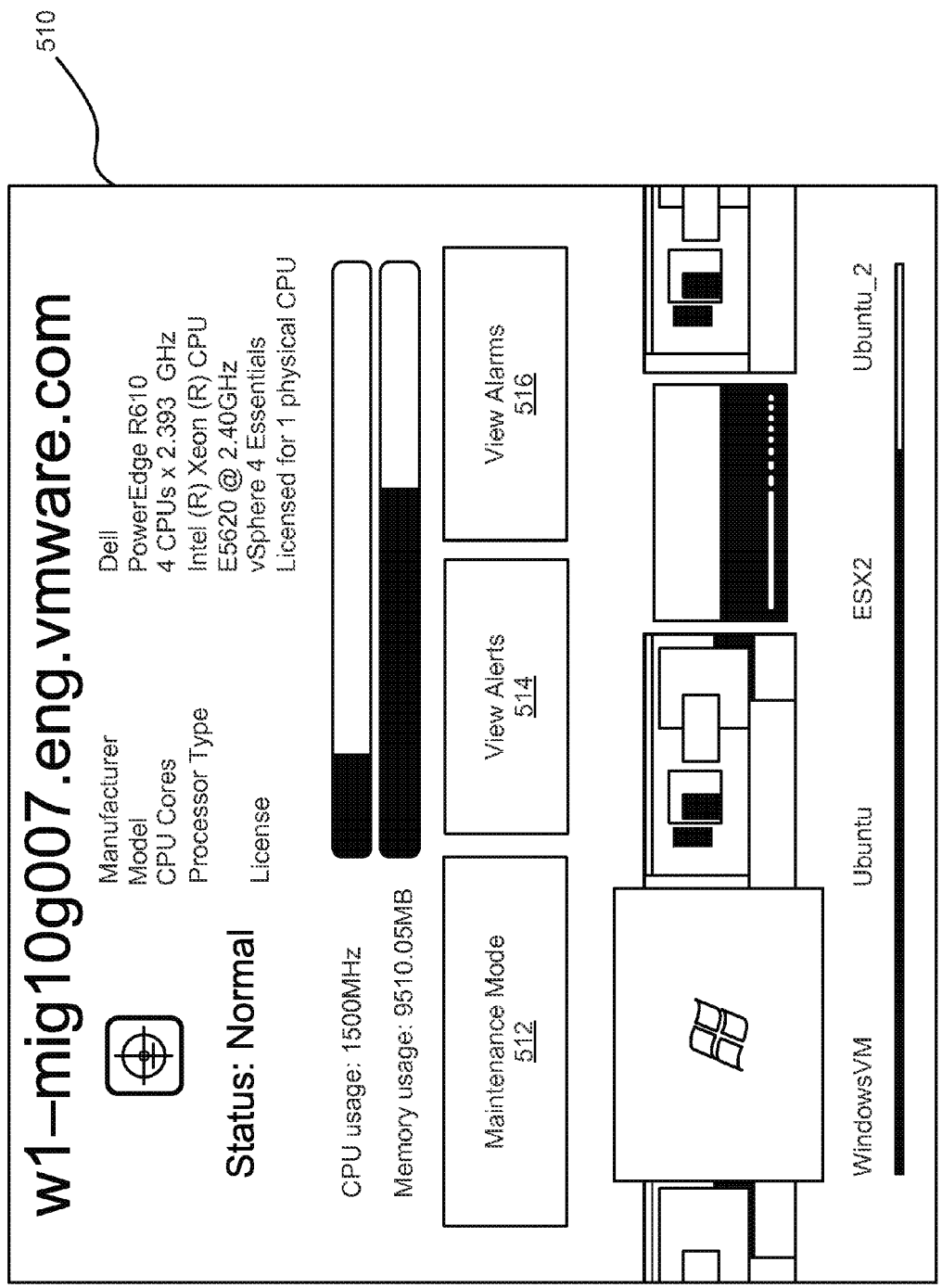
FIG. 5 depicts a screenshot of visual object, according to various embodiments.

FIG. 5 depicts a screenshot of visual object 510 that is displayed on display 142 such that augmented reality is provided. For example, visual object 510 is overlaid on a frame marker attached to a server.

Visual object 510 depicts information associated with the device. For example, visual object 510 displays the name of the server (i.e., w1-mig10 g00.eng.vmware.com), device details (i.e., manufacturer, model, CPU cores, processor type, license, etc.), resource allocation/usage (e.g., CPU allocation/usage, memory allocation/usage) for virtual machines.

Visual object 510, in one embodiment, is a user interface for the underlying physical hardware. For example, visual object 510 includes user selectable tabs, such as, maintenance mode 512, view alerts 514 and view alarms 516.

Accordingly, an IT administrator, when located at the physical device, is able to interface with the device via an augmented user interface (e.g., a user interface for vCOPS, VCD, vCAC, etc.) displayed on display 142 of remote device 140. For instance, the IT administrator is able to select one or more of maintenance mode 512, view alerts 514 and view alarms 516 to facilitate in maintenance and/or troubleshooting for the device. Additionally, the user interface may allow for selection of power on/off, reset, etc.

In various embodiments, the augmented reality user interface is based on an SDK framework to project a 2D user interface into 3D space and transform gestures (e.g., taps, touches, etc.) appropriately between the different coordinate spaces. For example, an Android™ SDK is utilized to render 2D interface "views", or user interface hierarchies, into bitmaps. Once a 2D interface bitmap is rendered, the view can be projected into 3D space as the texture of a plane above the indicia's camera space coordinates.

Additionally, in one embodiment, touch events (e.g., taps, touches, etc.) on display 142 are translated to determine if they coincide with a host user interface view overlaid on indicia. Upon detecting a touch event inside the view, the coordinates of the touch event are determined and are correlated with the view's 2D layer to be interpreted as a relative touch event on the appropriate host view. This then triggers a corresponding action of the touch event. The user interface may be controlled by voice commands and/or gestures.

Example Methods of Operation

The following discussion sets forth in detail the operation of some example methods of operation of embodiments. With reference to FIGS. 6, 7, 8 and 9, flow diagrams 600, 700, 800 and 900 illustrate example procedures used by various embodiments. Flow diagrams 600-900 include some procedures that, in various embodiments, are carried out by a processor under the control of computer-readable and computer-executable instructions. In this fashion, procedures described herein and in conjunction with flow diagrams 600, 700, 800 and/or 900 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., remote device 140, physical infrastructure 120, etc.) and/or cloud environments (e.g. virtualization infrastructure 110). The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in flow diagrams 600, 700, 800 and 900, such procedures are examples. That is, embodiments are well suited to performing various other procedures or variations of the procedures recited in flow diagrams 600, 700, 800 and 900. Likewise, in some embodiments, the procedures in flow diagrams 600, 700, 800 and 900 may be performed in an order different than presented and/or not all of the procedures described in one or more of these flow diagrams may be performed. It is further appreciated that procedures described in flow diagrams 600, 700, 800 and 900 may be implemented in hardware, or a combination of hardware with firmware and/or software.

Figure 6:
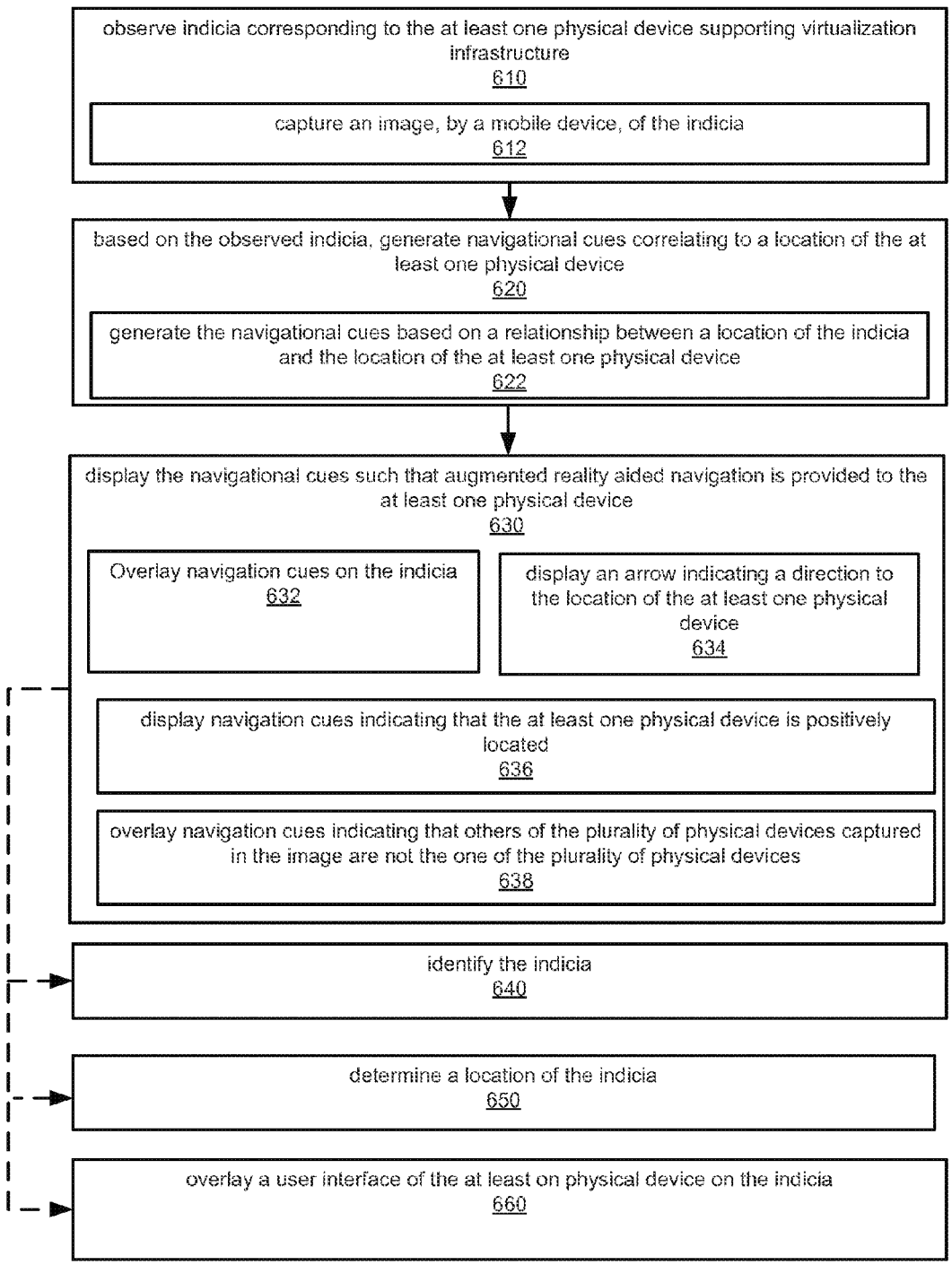
FIG. 6 depicts a flow diagram for a method for augmented reality aided navigation to at least one physical device, according to various embodiments.

FIG. 6 depicts a process flow diagram 600 for augmented reality aided navigation to at least one physical device, according to various embodiments.

At 610, indicia corresponding to the at least one physical device supporting virtualization infrastructure is observed. For example, camera 144 observes indicia 370 (e.g., a frame marker) located on a wall in physical infrastructure 120, wherein the indicia corresponds to at least one computing physical hardware (e.g., server) that supports virtualization infrastructure 110.

At 612, in one embodiment, an image is captured, by a mobile device, of the indicia. For example, camera 144 of a remote device 140 (e.g., iPad™) captures an image, in real-time, of indicia 370.

At 620, based on the observed indicia, navigational cues are generated correlating to a location of the at least one physical device. For example, in response to observing indicia 370, by camera 144, navigation cues (e.g., an arrow) is generated that correlates to a location of a sought after physical device (e.g., server).

At 622, in one embodiment, the navigational cues are generated based on a relationship between a location of the indicia and the location of the at least one physical device. For example, an arrow is generated that points to the right because the physical device is to the right of the location that the frame marker is observed.

At 630, the navigational cues are displayed such that augmented reality aided navigation is provided to the at least one physical device. For example, navigational cue 310 is displayed on display 142 such that it is orientated in relation to real world images (e.g., actual wall or side wall of a row) that are viewed through the camera of the mobile device. As a result, augmented reality aided navigation is provided to the at least one physical device.

At 632, navigation cues are overlayed on the indicia. For example, navigational cue 310 is overlayed and oriented with indicia 370 on display 142.

At 634, an arrow is displayed indicating a direction to the location of the at least one physical device. For example, an arrow (i.e., navigational cute 310) is displayed that indicates that the physical hardware is to the right of observed indicia 370.

At 636, navigation cues are displayed indicating that the at least one physical device is positively located. For example, an IT administrator is looking for the location of device 260-1. When indicia 270-1 is observed by camera 144, visual object 410-1 (e.g., a green light) is displayed that indicates that the device 260-1 is positively located such that the IT administrator may provide maintenance to the correct device at the location of the device.

At 638, navigation cues are overlayed indicating that others of the plurality of physical devices captured in the image are not the one of the plurality of physical devices. For example, an IT administrator is looking for the location of device 260-1. When indicia 270-2 and 270-n are observed by camera 144, visual objects 410-2 and 410-n (e.g., a red light) are overlayed on indicia 270-2 and 270-n, respectively that indicates that devices 260-2 and 260-n are not the devices that are intended to be located.

At 640, the indicia is identified. For example, indicia 370 is observed by camera 144 and software 146 identifies indicia 370 by unique visual markings on the indicia.

At 650, a location of the indicia is determined. For example, mappings 134 indicates that indicia 370 is located on a side-wall of row 220-1. Accordingly, software 146 determines the location of indicia 370 as being located on the side-wall of row 220-1.

At 660, a user interface of the at least on physical device is overlayed on the indicia. For example, visual object 510, a user interface, is overlayed on indicia 270-1 of device 260-1 when camera 144 observes indicia 270-1. As a result, a user is able to interact and control device 260-1 at its location on rack 230-1.

It is noted that any of the procedures, stated above, regarding flow diagram 600 may be implemented in hardware, or a combination of hardware with firmware and/or software. For example, any of the procedures are implemented by a processor(s) of a cloud environment and/or a computing environment.

Figure 7:
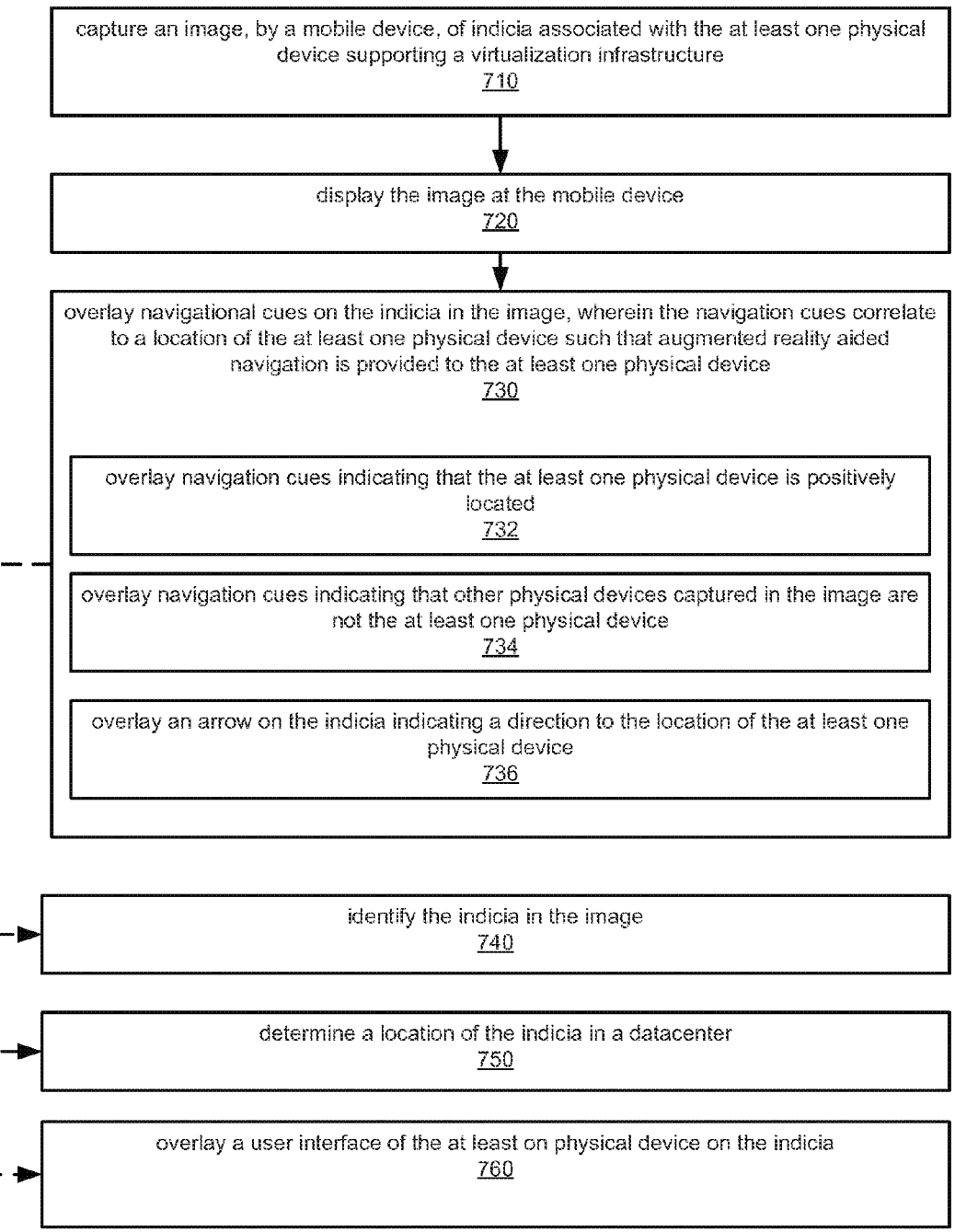
FIG. 7 depicts a flow diagram for a method for augmented reality aided navigation to at least one physical device, according to various embodiments.

FIG. 7 depicts a process flow diagram 700 for augmented reality aided navigation to at least one physical device, according to various embodiments.

At 710, capture an image, by a mobile device, of indicia associated with the at least one physical device supporting a virtualization infrastructure. For example, camera 144 of mobile remote device 140 observes indicia 370 (e.g., a frame marker) located on a wall in physical infrastructure 120, wherein the indicia corresponds to at least one computing physical hardware (e.g., server) that supports virtualization infrastructure 110.

At 720, the image is displayed at the mobile device. For example, the image captured by camera 144 is displayed in real-time on display 142.

At 730, navigational cues are overlayed on the indicia in the image, wherein the navigation cues correlate to a location of the at least one physical device such that augmented reality aided navigation is provided to the at least one physical device. For example, navigational cue 310 is displayed on display 142 such that it is orientated in relation to real world images (e.g., actual wall or side wall of a row) that are viewed through the camera of the mobile device. As a result, augmented reality aided navigation is provided to the at least one physical device.

At 732, navigation cues are overlayed indicating that the at least one physical device is positively located. For example, an IT administrator is looking for the location of device 260-1. When indicia 270-1 is observed by camera 144, visual object 410-1 (e.g., a green light) is displayed that indicates that the device 260-1 is positively located such that the IT administrator may provide maintenance to the correct device at the location of the device.

At 734, overlay navigation cues indicating that other physical devices captured in the image are not the at least one physical device. For example, an IT administrator is looking for the location of device 260-1. When indicia 270-2 and 270-n are observed by camera 144, visual objects 410-2 and 410-n (e.g., a red light) are overlayed on indicia 270-2 and 270-n, respectively that indicates that devices 260-2 and 260-n are not the devices that are intended to be located.

At 736, an arrow is overlayed on the indicia indicating a direction to the location of the at least one physical device. For example, an arrow (i.e., navigational cute 310) is displayed that indicates that the physical hardware is to the right of observed indicia 370.

At 740, the indicia in the image is identified. For example, indicia 370 is observed by camera 144 and software 146 identifies indicia 370 by unique visual markings on the indicia.

At 750, a location of the indicia in a datacenter is determined. For example, mappings 134 indicate that indicia 370 is located on a side-wall of row 220-1 within a datacenter. Accordingly, software 146 determines the location of indicia 370 as being located on the side-wall of row 220-1.

At 760, a user interface of the at least on physical device is overlayed on the indicia. For example, visual object 510, a user interface, is overlayed on indicia 270-1 of device 260-1 when camera 144 observes indicia 270-1. As a result, a user is able to interact and control device 260-1 at its location on rack 230-1.

It is noted that any of the procedures, stated above, regarding flow diagram 700 may be implemented in hardware, or a combination of hardware with firmware and/or software. For example, any of the procedures are implemented by a processor(s) of a cloud environment and/or a computing environment.

Figure 8:
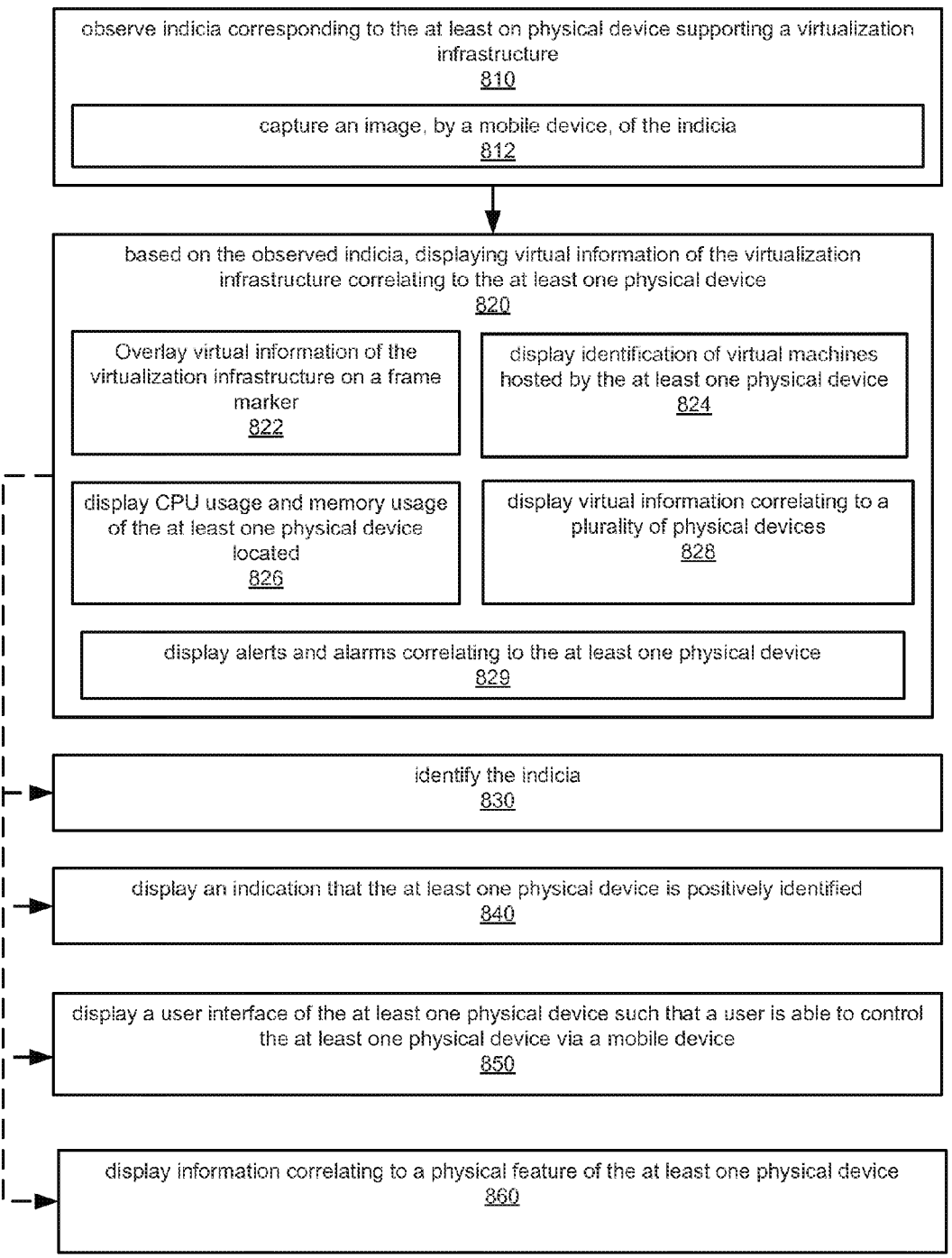
FIG. 8 depicts a flow diagram for a method for augmenting a physical device with virtual information, according to various embodiments.

FIG. 8 depicts a process flow diagram 800 for augmenting a physical device with virtual information, according to various embodiments.

At 810, indicia corresponding to the at least on physical device supporting a virtualization infrastructure is observed. For example, camera 144 of mobile remote device 140 observes indicia 370 (e.g., a frame marker) located on a wall in physical infrastructure 120, wherein the indicia corresponds to at least one computing physical hardware (e.g., server) that supports virtualization infrastructure 110.

At 812, in one embodiment, an image is captured, by a mobile device, of the indicia. For example, camera 144 of a remote device 140 (e.g., Google Glass™) captures an image, in real-time, of indicia 370.

At 820, based on the observed indicia, virtual information of the virtualization infrastructure correlating to the at least one physical device is displayed. For example, in response to observing indicia 270-2 (corresponding to device 260-2), all the virtual machines hosted by device 260-2 are displayed.

At 822, virtual information of the virtualization infrastructure is overlayed on a frame marker. For example, memory and CPU usage by virtual machines hosted by a particular device are overlayed on an associated indicia such that memory and CPU usage is orientated in relation to real world images that are viewed through the camera of the mobile device. As a result, augmented reality is provided to the at least one physical device.

At 824, identification of virtual machines hosted by the at least one physical device are displayed. For example, visual object 410-1 may include a list of virtual machines hosted by device 260-1.

At 826, CPU usage and memory usage of the at least one physical device located are displayed. For example, the user interface (e.g., as shown in FIG. 5) depicts the CPU usage and memory usage for virtual machines hosted by the server.

At 828, virtual information correlating to a plurality of physical devices. For example, visual objects 410-1, 410-2, and 410-n depict the virtual machines hosted by the respective servers.

At 829, alerts and alarms correlating to the at least one physical device are displayed. For example, the user interface (e.g., as shown in FIG. 5) allows for the selection of view alerts 514 which displays previous alerts associated with the device and view alarms 516 which displays previous alarms associated with the device.

At 830, the indicia is identified. For example, indicia 270-1 is observed by camera 144 and software 146 identifies indicia 270-1 by unique visual markings on the indicia.

At 840, an indication that the at least one physical device is positively identified is displayed. For example, an IT administrator is looking for the location of device 260-1. When indicia 270-1 is observed by camera 144, visual object 410-1 (e.g., a green light) is displayed that indicates that the device 260-1 is positively located such that the IT administrator may provide maintenance to the correct device at the location of the device.

At 850, a user interface of the at least one physical device is displayed such that a user is able to control the at least one physical device via a mobile device. For example, visual object 510, a user interface, is overlayed on indicia 270-1 of device 260-1 when camera 144 observes indicia 270-1. As a result, a user is able to interact and control device 260-1 at its location on rack 230-1.

At 860, information correlating to a physical feature of the at least one physical device is displayed. For example, the identification of network ports (e.g., visual objects 412-1, 412-2, and 412-n) are overlayed on the network ports (e.g., features 261-1, 261-2, and 261-n) of the network switch, as depicted, for example, in FIG. 4C.

It is noted that any of the procedures, stated above, regarding flow diagram 800 may be implemented in hardware, or a combination of hardware with firmware and/or software. For example, any of the procedures are implemented by a processor(s) of a cloud environment and/or a computing environment.

Figure 9:
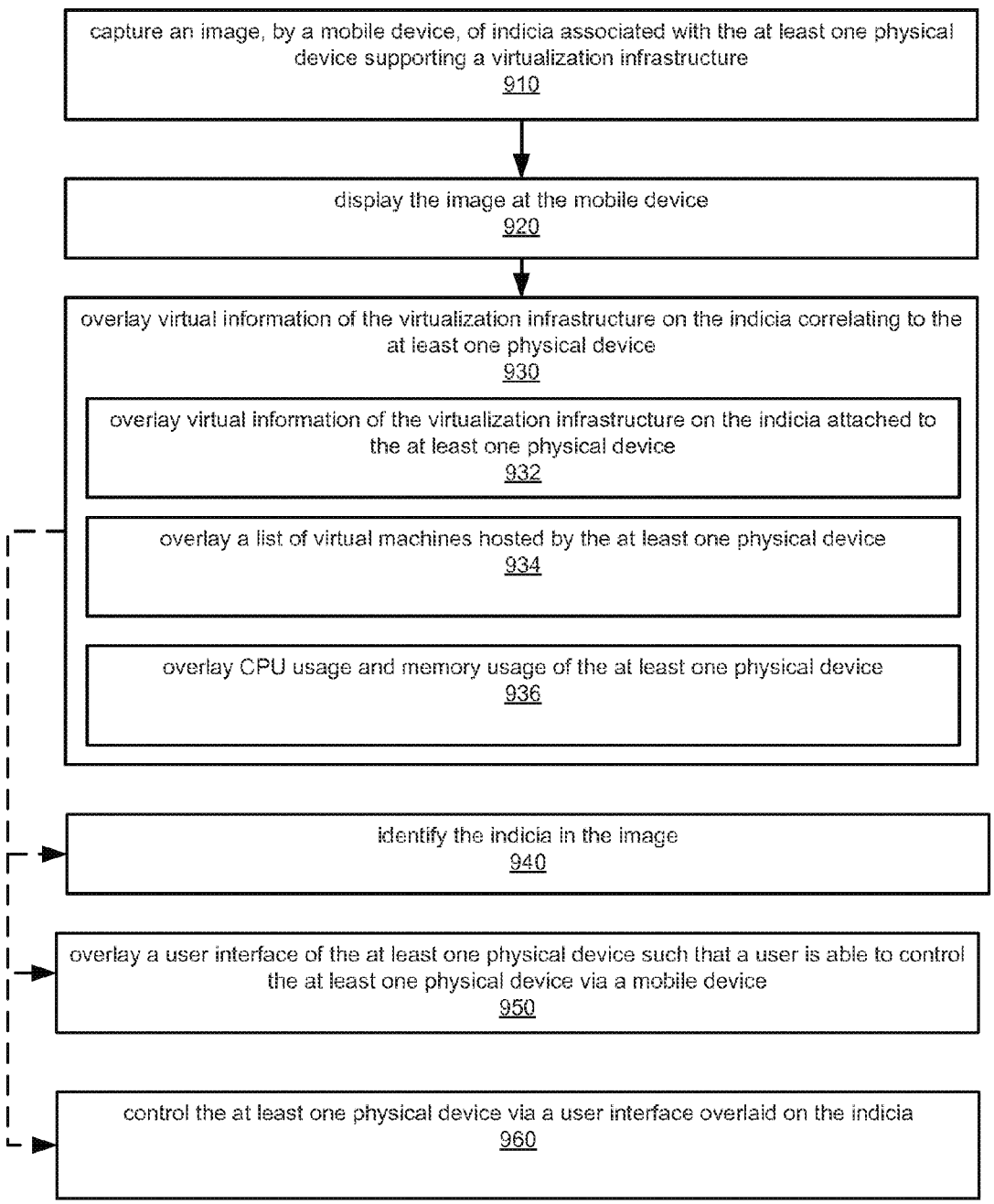
FIG. 9 depicts a flow diagram for a method for augmenting a physical device with virtual information, according to various embodiments.

FIG. 9 depicts a process flow diagram 900 for augmenting a physical device with virtual information, according to various embodiments.

At 910, an image is captured, by a mobile device, of indicia associated with the at least one physical device supporting a virtualization infrastructure. For example, camera 144 of mobile remote device 140 observes indicia 370 (e.g., a frame marker) located on a wall in physical infrastructure 120, wherein the indicia corresponds to at least one computing physical hardware (e.g., server) that supports virtualization infrastructure 110.

At 920, the image at the mobile device. For example, the image captured by the camera is displayed in real-time on display 142.

At 930, virtual information of the virtualization infrastructure is overlayed on the indicia correlating to the at least one physical device. For example, in response to observing indicia 270-2 (corresponding to device 260-2), all the virtual machines hosted by device 260-2 are displayed.

At 932, overlay virtual information of the virtualization infrastructure on the indicia attached to the at least one physical device. For example, memory and CPU usage by virtual machines hosted by a particular device are overlayed on an associated indicia such that memory and CPU usage is orientated in relation to real world images that are viewed through the camera of the mobile device. As a result, augmented reality is provided to the at least one physical device.

At 934, a list of virtual machines hosted by the at least one physical device is overlayed. For example, each virtual machine hosted by device 260-2 is overlayed as visual object 410-2.

At 936, CPU usage and memory usage of the at least one physical device is overlayed. For example, memory and CPU usage by virtual machines hosted by a particular device are overlayed on an associated indicia such that memory and CPU usage is orientated in relation to real world images that are viewed through the camera of the mobile device. As a result, augmented reality is provided to the at least one physical device.

At 940, the indicia in the image is identified. For example, the indicia is identified. For example, indicia 270-1 is observed by camera 144 and software 146 identifies indicia 270-1 by unique visual markings on the indicia.

At 950, overlay a user interface of the at least one physical device such that a user is able to control the at least one physical device via a mobile device At 960, the at least one physical device is controlled via a user interface overlaid on the indicia. For example, visual object 510, a user interface, is overlayed on indicia 270-1 of device 260-1 when camera 144 observes indicia 270-1. As a result, a user is able to interact and control device 260-1 at its location on rack 230-1.

It is noted that any of the procedures, stated above, regarding flow diagram 900 may be implemented in hardware, or a combination of hardware with firmware and/or software. For example, any of the procedures are implemented by a processor(s) of a cloud environment and/or a computing environment.

Example Host Computer System

Figure 10:
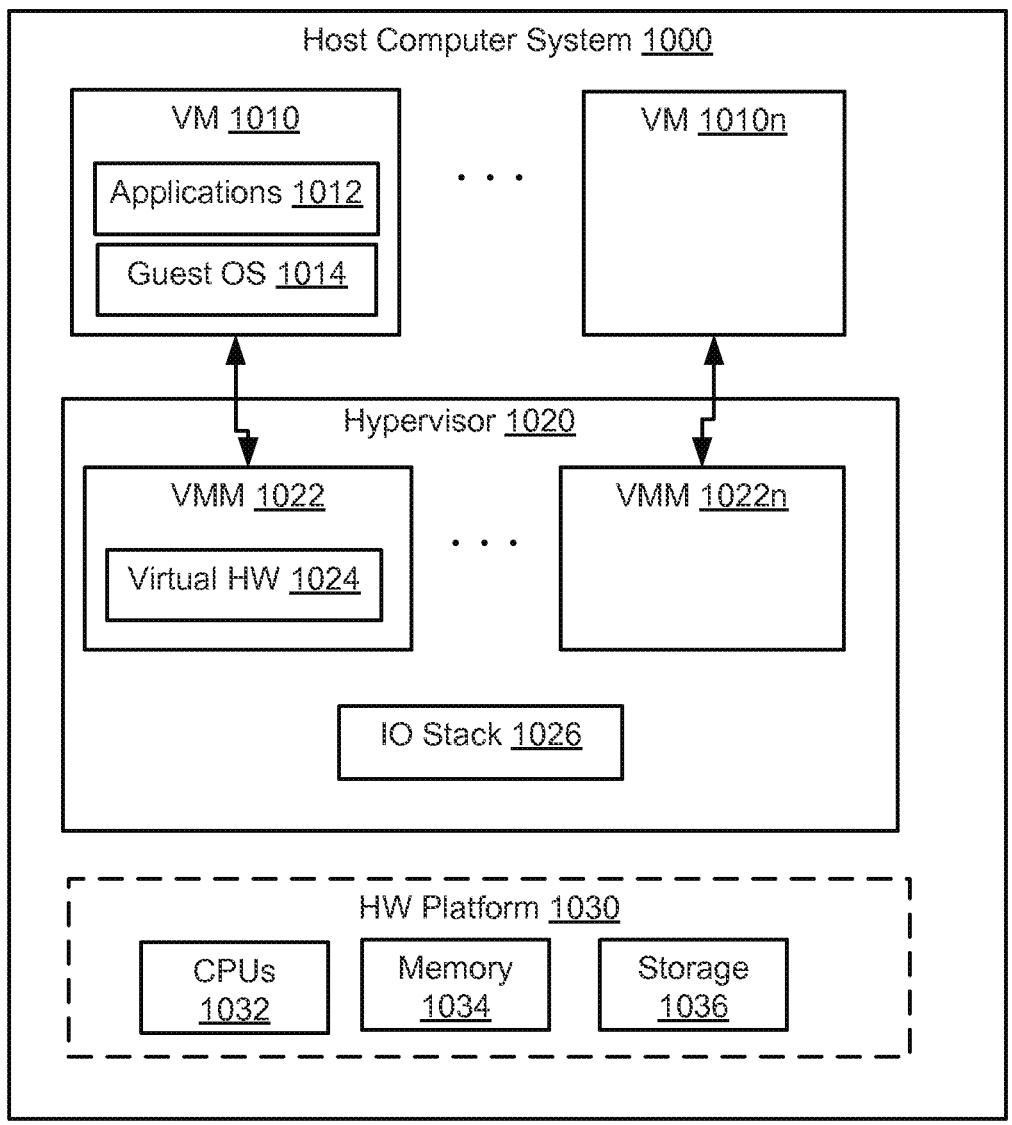
FIG. 10 depicts a block diagram that illustrates an embodiment of a host computing system.

FIG. 10 is a schematic diagram that illustrates a virtualized computer system that is configured to carry out one or more embodiments of the present invention. The virtualized computer system is implemented in a host computer system 1000 including hardware platform 1030. In one embodiment, host computer system 1000 is constructed on a conventional, typically server-class, hardware platform.

Hardware platform 1030 includes one or more central processing units (CPUs) 1032, system memory 1034, and storage 1036. Hardware platform 1030 may also include one or more network interface controllers (NICs) that connect host computer system 1000 to a network, and one or more host bus adapters (HBAs) that connect host computer system 1000 to a persistent storage unit.

Hypervisor 1020 is installed on top of hardware platform 1030 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 1024 for virtual machine 1010 supports the installation of guest OS 1014 which is capable of executing applications 1012 within virtual machine 1010.

Guest OS 1014 may be any of the well-known commodity operating systems, and includes a native file system layer, for example, either an NTFS or an ext3FS type file system layer. IOs issued by guest OS 1014 through the native file system layer appear to guest OS 1016 as being routed to one or more virtual disks provisioned for virtual machine 1010 for final execution, but such IOs are, in reality, are reprocessed by IO stack 1026 of hypervisor 1020 and the reprocessed IOs are issued, for example, through an HBA to a storage system.

Virtual machine monitor (VMM) 1022 and 1022n may be considered separate virtualization components between the virtual machines and hypervisor 1020 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for augmented reality aided navigation within a datacenter to at least one physical device supporting virtualization infrastructure and for augmenting said at least one physical device with virtual information associated with said at least one physical device, said computer-implemented method comprising:
   capturing an image, by a mobile device, of indicia corresponding to said at least one physical device supporting said virtualization infrastructure, wherein said at least one physical device is located in said datacenter;
   identifying said indicia;
   determining a location of said indicia;
   based on a relationship between a location of said indicia and said location of said at least one physical device supporting said virtualization infrastructure, generating navigational cues correlating to a location within said datacenter of said at least one physical device supporting said virtualization infrastructure;
   displaying said navigational cues such that augmented reality aided navigation is provided to said at least one physical device supporting said virtualization infrastructure; and
   based on said indicia, displaying virtual information of said virtualization infrastructure correlating to said at least one physical device, said virtual information including CPU usage and memory information corresponding to said virtualization infrastructure, wherein said displaying is performed by said mobile device and said virtual information is displayed on a display of said mobile device.

2. The computer-implemented method of claim 1, wherein said displaying said navigational cues further comprise:
   overlaying navigation cues on said indicia.

3. The computer-implemented method of claim 1, wherein displaying said navigational cues further comprise:
   displaying an arrow indicating a direction to said location of said at least one physical device.

4. The computer-implemented method of claim 1, wherein said displaying said navigational cues further comprise:
   displaying navigation cues indicating that said at least one physical device is positively located.

5. The computer-implemented method of claim 1, wherein displaying said navigational cues further comprise:
   overlaying navigation cues indicating that others of a plurality of physical devices captured in an image, by a mobile device, of said indicia are not said at least one physical device.

6. The computer-implemented method of claim 1, further comprising:
   overlaying a user interface of said at least on physical device on said indicia.

7. The computer-implemented method of claim 1, wherein said at least one physical device is selected from a group consisting of: a server, a router, and a network switch.

8. The computer-implemented method of claim 1, wherein said indicia is attached to said at least one physical device.

9. A non-transitory computer-readable storage medium having instructions embodied therein which, when executed, causes a computer system to perform a method for augmented reality aided navigation within a datacenter to at least one physical device supporting virtualization infrastructure and for augmenting said at least one physical device with virtual information associated with said at least one physical device, said method comprising:
   capturing an image, by a mobile device, of indicia associated with said at least one physical device supporting said virtualization infrastructure, wherein said at least one physical device is located in said datacenter;
   identifying said indicia;
   determining a location of said indicia;
   displaying said image at said mobile device;
   based on a relationship between a location of said indicia and said location of said at least one physical device supporting said virtualization infrastructure, generating navigational cues correlating to a location of said at least one physical device supporting said virtualization infrastructure;
   overlaying navigational cues on said indicia in said image, wherein said navigation cues correlate to a location within said datacenter of said at least one physical device supporting said virtualization infrastructure such that augmented reality aided navigation is provided to said at least one physical device supporting said virtualization infrastructure; and
   based on said indicia, displaying virtual information of said virtualization infrastructure correlating to said at least one physical device, said virtual information including CPU usage and memory information corresponding to said virtualization infrastructure, wherein said displaying is performed by said mobile device and said virtual information is displayed on a display of said mobile device.

10. The non-transitory computer-readable storage medium of claim 9, further comprising:
    determining a location of said indicia in a datacenter.

11. The non-transitory computer-readable storage medium of claim 9, overlaying navigation cues indicating that said at least one physical device is positively located.

12. The non-transitory computer-readable storage medium of claim 9, overlaying navigation cues indicating that other physical devices captured in said image are not said at least one physical device.

13. The non-transitory computer-readable storage medium of claim 9, overlaying an arrow on said indicia indicating a direction to said location of said at least one physical device.

14. The non-transitory computer-readable storage medium of claim 9, further comprising:
  overlaying a user interface of said at least one physical device on said indicia.

\* \* \* \* \*